(12) United States Patent
Song

(10) Patent No.: US 7,761,911 B2
(45) Date of Patent: Jul. 20, 2010

(54) METHOD AND APPARATUS FOR FACILITATING SINGLE SIGN-ON

(75) Inventor: Baogang Song, Hillsboro, OR (US)

(73) Assignee: Oracle International Corporation, Redwood Shores, CA (US)

( * ) Notice: Subject to any disclaimer, the term of this patent is extended or adjusted under 35 U.S.C. 154(b) by 1276 days.

(21) Appl. No.: 11/285,642

(22) Filed: Nov. 21, 2005

(65) Prior Publication Data

US 2007/0118890 A1    May 24, 2007

(51) Int. Cl.
*G06F 7/04* (2006.01)
*G06F 15/16* (2006.01)
*G06F 17/30* (2006.01)
*H04L 29/06* (2006.01)

(52) U.S. Cl. .......................................................... 726/9
(58) Field of Classification Search ...................... 726/9
See application file for complete search history.

(56) References Cited

U.S. PATENT DOCUMENTS

| 7,137,006 B1* | 11/2006 | Grandcolas et al. | 713/180 |
| 2005/0177730 A1* | 8/2005 | Davenport et al. | 713/182 |
| 2005/0204148 A1* | 9/2005 | Mayo et al. | 713/185 |

* cited by examiner

*Primary Examiner*—Kambiz Zand
*Assistant Examiner*—Stephen Sanders
(74) *Attorney, Agent, or Firm*—Park, Vaughan & Fleming LLP

(57) ABSTRACT

One embodiment of the present invention provides a system that facilitates single sign-on of a client, wherein single sign-on allows the client to provide authentication credentials once during a computing session and to access multiple resources without re-authenticating. The system operates by receiving a domain cookie forwarded from the client by an application server at a single sign-on server, wherein the domain cookie includes a domain identifier and an encrypted secret path, and wherein the domain cookie can only be retrieved by servers whose domain matches the domain identifier in the domain cookie. The system then decrypts the encrypted secret path to reveal an unencrypted secret path. Next, the system redirects the client to the unencrypted secret path, wherein the unencrypted secret path is a path that terminates on the single sign-on server. Upon redirection, the system sends a request to the client from the single sign-on server requesting a domain-token cookie, wherein the domain-token cookie includes the domain identifier, a clear secret path, and encrypted information, wherein the request includes the clear secret path, and wherein the domain-token cookie can only be retrieved from the client if the client determines that the unencrypted secret path and the clear secret path match. Finally, upon receiving the domain-token cookie from the client at the single sign-on server, the system authenticates the client.

20 Claims, 2 Drawing Sheets

METHOD AND APPARATUS FOR FACILITATING SINGLE SIGN-ON

BACKGROUND

1. Field of the Invention

The present invention relates to computer systems. More specifically, the present invention relates to a method and an apparatus for facilitating single sign-on of a client to access multiple computational applications and resources within an enterprise without having to re-authenticate.

2. Related Art

Single sign-on servers have been deployed in many enterprises to improve customer satisfaction, reduce authentication overhead, and to maintain stricter compliance with security policies. A single sign-on server allows a user to authenticate one time, and subsequently allows the user to access multiple applications and resources within an enterprise without having to re-authenticate. In many cases, these applications and resources are located on different servers in different locations.

Single sign-on servers typically operate by sending a cookie to a client. A cookie includes information that can be stored on the client by the single sign-on server, and can be retrieved at a later time. Host cookies can be retrieved only by the server that is designated as the host of the cookie, however, domain cookies can be retrieved by any server that is a member of the same domain as the server that assigned the cookie. Because of this flexibility, domain cookies are often used for single sign-on purposes.

Cookie implementations, in their current form, are not an effective mechanism for preventing nefarious individuals from gaining access to single sign-on systems. Cookies are easy to hijack and can be manipulated because they are stored on the client. In addition, because domain cookies can be retrieved by any server within the same domain as the issuer, nothing is stopping an nefarious individual from deploying a rogue server within a domain to collect these cookies.

Hence, what is needed is a secure means for implementing single sign-on without the limitations listed above.

SUMMARY

One embodiment of the present invention provides a system that facilitates single sign-on of a client, wherein single sign-on allows the client to provide authentication credentials once during a computing session and to access multiple resources without re-authenticating. The system operates by receiving a domain cookie forwarded from the client by an application server at a single sign-on server, wherein the domain cookie includes a domain identifier and an encrypted secret path, and wherein the domain cookie can only be retrieved by servers whose domain matches the domain identifier in the domain cookie. The system then decrypts the encrypted secret path to reveal an unencrypted secret path. Next, the system redirects the client to the unencrypted secret path, wherein the unencrypted secret path is a path that terminates on the single sign-on server. Upon redirection, the system sends a request to the client from the single sign-on server requesting a domain-token cookie, wherein the domain-token cookie includes the domain identifier, a clear secret path, and encrypted information, wherein the request includes the clear secret path, and wherein the domain-token cookie can only be retrieved from the client if the client determines that the unencrypted secret path and the clear secret path match. Finally, upon receiving the domain-token cookie from the client at the single sign-on server, the system authenticates the client.

In a variation on this embodiment, prior to receiving the domain cookie, the system receives an operation request from the client at an application server that requires authentication of the client. In response to the operation request, the system sends a second request to the client for a domain cookie. In response to the second request, the system receives the domain cookie at the application server. Finally, the system forwards the domain cookie to the single sign-on server.

In a variation on this embodiment, the second request includes a request for a host cookie, wherein the host cookie includes encrypted user identification information. The system further involves receiving the host cookie at the application server, and authenticating the client.

In a further variation, wherein upon authenticating the client, the system creates a new host cookie. The system also creates a new secret path on the single sign-on server and encrypts the new secret path to create a new encrypted secret path. In addition, the system creates a new domain cookie including the new encrypted secret path and a new domain-token cookie including the new secret path. Finally, the system issues the new host cookie, the new domain cookie, and the new domain-token cookie to the client.

In a variation on this embodiment, upon each successful authentication, the encrypted secret path and the clear secret path are changed.

In a variation on this embodiment, the encrypted secret path and the clear secret path are created from a random value.

In a variation on this embodiment, the client is a browser.

In a variation on this embodiment, the single sign-on server is an Oracle Single Sign-On Server.

In a variation on this embodiment, the application server is an Oracle Application Server.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Enterprise Environment

Figure 1:
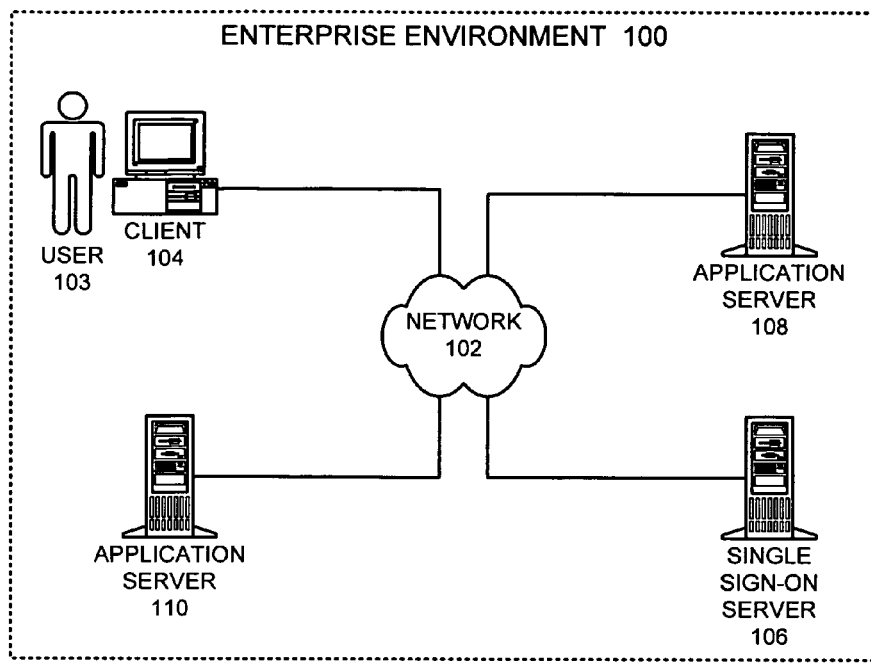
FIG. 1 illustrates an enterprise environment in accordance with an embodiment of the present invention.

FIG. 1 illustrates an enterprise environment 100 in accordance with an embodiment of the present invention. Enterprise environment 100 includes network 102, user 103, client 104, single sign-on server 106 and application servers 108 and 110.

Network 102 can generally include any type of wired or wireless communication channel capable of coupling together computing nodes. This includes, but is not limited to, a local area network, a wide area network, or a combination of networks. In one embodiment of the present invention, network 102 includes the Internet.

Client 104 can generally include any node on a network including computational capability and including a mechanism for communicating across the network.

Single sign-on server 106 and application servers 108 and 110 can generally include any nodes on a computer network including a mechanism for servicing requests from a client for computational and/or data storage resources.

Client 104, single sign-on server 106, and application servers 108 and 110 are couple together via network 102. When user 103 wishes to access applications and resources on application servers 108 and 110 via client 104, user 103 must first authenticate with single sign-on server 106. Once user 103 has been authenticated, it is not necessary for user 103 to re-authenticate to use further resources. Re-authentication happens behind the scenes and is described in more detail below in the description of FIG. 3.

In one embodiment of the present invention, application servers 108 and 110 are partner servers. Once user 103 has authenticated with application server 108, user 103 can access application server 110 directly, without having to re-authenticate.

Single Sign-On Cookies

Figure 2:
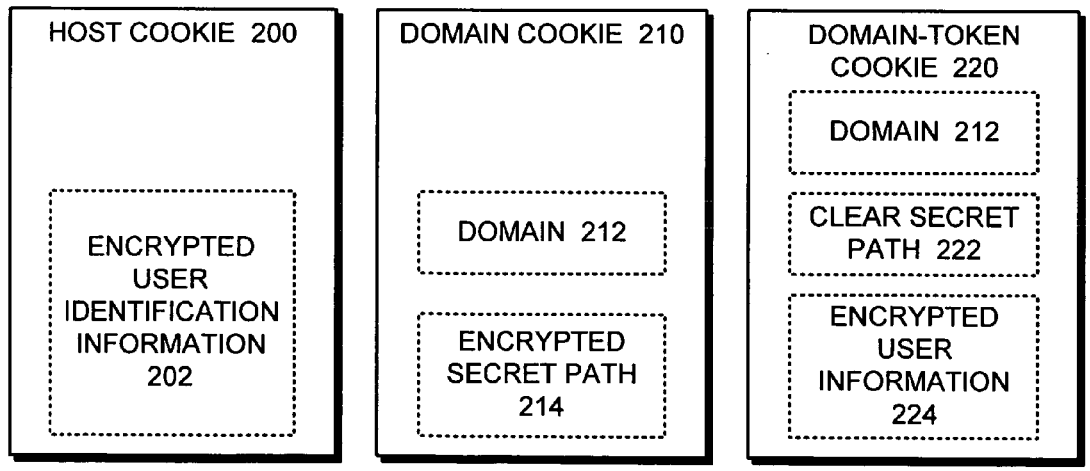
FIG. 2 illustrates single sign-on cookies in accordance with an embodiment of the present invention.

FIG. 2 illustrates single sign-on cookies in accordance with an embodiment of the present invention. One embodiment of the present invention uses a host cookie 200, a domain cookie 210, and a domain-token cookie 220 to implement single sign-on. Host cookie 200 includes encrypted user identification information 202. This encrypted user identification information 202 is encrypted with a key that is known only to single sign-on server 106. In general, host cookie 202 can only be retrieved by the server that assigned host cookie 202.

Domain token cookie 210 includes an identifier for domain 212 and encrypted secret path 214. Encrypted secret path 214, like encrypted user identification information 202, is encrypted with a key that is known only to single sign-on server 106. Domain cookie 210 can be retrieved by any server that is a member of the domain specified by domain 212. This includes application servers 108 and 110.

Domain-token cookie 220 includes an identifier for domain 212, clear secret path 222, and encrypted user information 224. Like domain cookie 210, domain-token cookie 220 can be retrieved by any server that is a member of the domain specified by domain 212. However, in order to retrieve domain-token cookie 220, a server must know the contents of clear secret path 222, which can only be obtained by decrypting encrypted secret path 214. Thus, if a nefarious individual has access to domain cookie 210 and host cookie 200, that individual cannot gain single sign-on access because he or she will not be able to get domain-token cookie 220 without the decryption key stored on single sign-on server 106.

In one embodiment of the present invention, when client 104 first authenticates with application server 108, a host cookie 200 is generated for client 104. (Domain cookie 210 and domain-token cookie 220 are also generated.) The next time client 104 accesses application server 108, client 104 presents host cookie 200 only, and client 104 will be granted access to application server 108. This is adequate for a very simple host cookie-based single server access environment. Note that host cookie 200 is considered secure because host cookie 200 is relatively hard to steal.

However, when client 104 tries to access application server 110 after the above interaction with application server 108, client 104 can not use the same host cookie 200 because host cookie 200 can not be sent to application server 110 by client 104. Only domain cookie 210 can be sent to different host on the same domain.

When client 104 subsequently accesses application server 108, both domain cookie 210 and host cookie 200 are presented. However, if host cookie 200 exists, only host cookie 200 is used. Domain-token cookie 220 will not be presented at all, because when domain-token cookie 220 was generated, it was specified that client 104 can only send domain-token cookie 220 if and only if the request is for the host on the same domain as specified by domain 212 and the path matches the clear secret path 222.

In one embodiment of the present invention, the way client 104 decides if or not to send a certain cookie is based on the host, domain and path. For example, in the case when the system generates host cookie 200 and domain cookie 210, the system sets the path to "/", which means any path will match. But when the system generates domain-token cookie 220, the system sets the path as the secret-path. When user 103 starts to access application server 110 after accessing application server 108, only the domain cookie 210 will be presented the first time.

However, application server 110 does not just trust domain cookie 210. In fact, application server 110 sends the encrypted secret path 214 in the domain cookie 210 to single sign-on server 106. Single sign-on server 106 decrypts the encrypted secret path 214 to reveal the clear secret path, and passes the clear secret path back to application server 110. With the clear secret path, application server 110 sends another request to client 104 to ask if client 104 has the domain-token cookie 220 which is based on this secret path (i.e. the clear secret path matches clear secret path 222). If client 104 can present domain-token cookie 220 based on this particular secret path, then client 104 can be trusted.

Once domain-token cookie 220 has been presented, the system creates three brand new cookies—host cookie 200, which will be used when client 104 subsequently accesses application server 110, domain cookie 210, which will be used when client 104 accesses any other partner server in the same domain, and domain-token cookie 220, for the next verification.

In one embodiment of the present invention, the encryption/decryption occurs only on single sign-on server 106.

Single Sign-On

Figure 3:
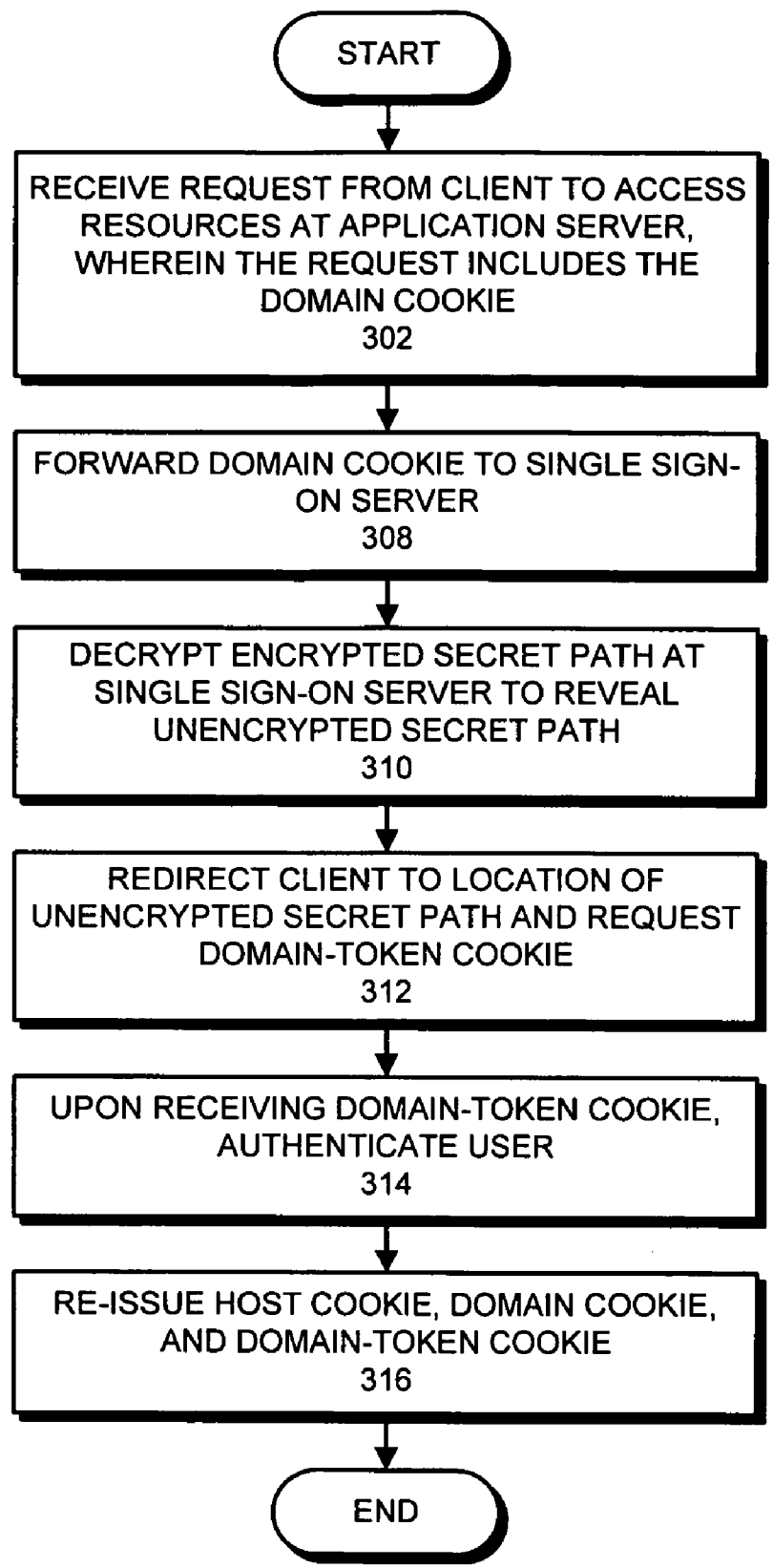
FIG. 3 presents a flowchart illustrating the process of single sign-on in accordance with an embodiment of the present invention.

FIG. 3 presents a flowchart illustrating the process of single sign-on in accordance with an embodiment of the present invention. The process of single sign-on starts when user 103 attempts to access resources on an application server, such as application server 108, within enterprise environment 100. The system starts when application server 108 receives a request to access resources from client 104, wherein the request includes domain cookie 210 (step 302). (Note that since client 104 has domain cookie 210, but does not have host cookie 200, it is implied that client 104 has not been authenticated to application server 108, but has been authenticated on a partner server in the same domain, such as application server 110.)

If client 104 does not have domain cookie 210, then user 103 has not been authenticated with single sign-on server 106, and client 104 is re-directed to single sign-on server 106 to authenticate user 103. If client 104 has domain cookie 210, then user 103 has been authenticated with single sign-on server 106 in the past, and the following steps happen in a manner that is undetectable to user 103.

In response to the request, application server 108 forwards domain cookie 210 to single sign-on server 106 (step 308). Single sign-on server 106 then decrypts encrypted secret path 214 to reveal the unencrypted secret path (step 310). Next, the system redirects the client to a location specified by the unencrypted secret path at requests the domain-token cookie 220 (step 312). Because the domain-token cookie 220 is only returned if the clear secret path 222 matches the unencrypted secret path, a nefarious individual would have to have the decryption key on single sign-on server 106 to obtain the domain-token cookie 220 and gain access to the system.

Upon receiving domain-token cookie 220, the single sign-on server 106 authenticates user 103 at client 104 (step 314) and allows client 104 to continue accessing resources on application server 108. In addition, single sign-on server 106 re-issues host cookie 200, domain cookie 210, and domain-token cookie 220 (step 316). In re-issuing the cookies, single sign-on server 106 creates a new random encrypted secret path 214 and corresponding clear secret path 222 to help protect against attack.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for preventing unauthorized access to a cookie during a single sign-on of a client, the method comprising:
   receiving a domain cookie from the client forwarded by an application server at a single sign-on server, wherein the domain cookie includes a domain identifier and encrypted secret path information which is encrypted using a key known only to the single sign-on server, and wherein the secret path information indicates a network path that terminates at the single sign-on server;
   decrypting the encrypted secret path information using the key to reveal the network path;
   sending a request to the client requesting a domain-token cookie, wherein the request indicates the decrypted network path; and
   receiving the domain-token cookie from the client forwarded by the application server at the single sign-on server,
      wherein the domain-token cookie comprises the domain identifier, clear secret path information which indicates the network path, and user credential encrypted using the key known only to the single sign-on server, and
      wherein the network path derived from the clear secret path information in the domain-token cookie matches the decrypted network path in the request.

2. The method of claim 1, wherein prior to receiving the domain cookie, the method further comprises:
   receiving an operation request from the client at an application server that requires authentication of the client;
   in response to the operation request, sending a second request to the client for a domain cookie;
   in response to the second request, receiving the domain cookie at the application server; and
   forwarding the domain cookie to the single sign-on server.

3. The method of claim 2, wherein the second request includes a request for a host cookie, wherein the host cookie includes encrypted user identification information; and wherein the method further comprises:
   receiving the host cookie at the application server; and
   authenticating the client.

4. The method of claim 3, wherein upon authenticating the client, the method further comprises:
   creating a new host cookie;
   creating a new secret path on the single sign-on server;
   encrypting the new secret path to create a new encrypted secret path;
   creating a new domain cookie including the new encrypted secret path;
   creating a new domain-token cookie including the new secret path; and
   issuing the new host cookie, the new domain cookie, and the new domain-token cookie to the client.

5. The method of claim 1, wherein upon each successful authentication, the encrypted secret path information and the clear secret path information are changed.

6. The method of claim 1, wherein the encrypted secret path information and the clear secret path information are created from a random value.

7. The method of claim 1, wherein the client is a browser.

8. The method of claim 1, wherein the single sign-on server is an Oracle Single Sign-On Server.

9. The method of claim 1, wherein the application server is an Oracle Application Server.

10. A computer-readable storage medium storing instructions that when executed by a computer cause the computer to perform a method for preventing unauthorized access to a cookie during a single sign-on of a client, the method comprising:
    receiving a domain cookie from the client forwarded by an application server at a single sign-on server, wherein the domain cookie includes a domain identifier and encrypted secret path information which is encrypted using a key known only to the single sign-on server, and wherein the secret path information indicates a network path that terminates at the single sign-on server;
    decrypting the encrypted secret path information using the key to reveal the network path;
    sending a request to the client requesting a domain-token cookie, wherein the request indicates the decrypted network path; and
    receiving the domain-token cookie from the client forwarded by the application server at the single sign-on server,
       wherein the domain-token cookie comprises the domain identifier, clear secret path information which indicates the network path, and user credential encrypted using the key known only to the single sign-on server, and wherein the network path derived from the clear secret path information in the domain-token cookie matches the decrypted network path in the request.

11. The computer-readable storage medium of claim 10, wherein prior to receiving the domain cookie, the method further comprises:

receiving an operation request from the client at an application server that requires authentication of the client;

in response to the operation request, sending a second request to the client for a domain cookie;

in response to the second request, receiving the domain cookie at the application server; and forwarding the domain cookie to the single sign-on server.

12. The computer-readable storage medium of claim 11, wherein the second request includes a request for a host cookie, wherein the host cookie includes encrypted user identification information; and wherein the method further comprises:

receiving the host cookie at the application server; and
authenticating the client.

13. The computer-readable storage medium of claim 12, wherein upon authenticating the client, the method further comprises:

creating a new host cookie;
creating a new secret path on the single sign-on server;
encrypting the new secret path to create a new encrypted secret path;
creating a new domain cookie including the new encrypted secret path;
creating a new domain-token cookie including the new secret path; and
issuing the new host cookie, the new domain cookie, and the new domain-token cookie to the client.

14. The computer-readable storage medium of claim 10, wherein upon each successful authentication, the encrypted secret path information and the clear secret path information are changed.

15. The computer-readable storage medium of claim 10, wherein the encrypted secret path information and the clear secret path information are created from a random value.

16. The computer-readable storage medium of claim 10, wherein the client is a browser.

17. The computer-readable storage medium of claim 10, wherein the single sign-on server is an Oracle Single Sign-On Server.

18. The computer-readable storage medium of claim 10, wherein the application server is an Oracle Application Server.

19. An apparatus for preventing unauthorized access to a cookie during a single sign-on of a client, the apparatus comprising:

a receiving mechanism configured to receive a domain cookie from the client forwarded by an application server at a single sign-on server, wherein the domain cookie includes a domain identifier and encrypted secret path information which is encrypted using a key known only to the single sign-on server, and wherein the secret path information indicates a network path that terminates at the single sign-on server;

a decryption mechanism configured to decrypt the encrypted secret path information using the key to reveal the network path;

a request mechanism configured to send a request to the client requesting a domain-token cookie, wherein the request indicates the decrypted network path; and wherein the receiving mechanism is further configured to receive the domain-token cookie from the client forwarded by the application server at the single sign-on server, wherein the domain-token cookie comprises the domain identifier, clear secret path information which comprises the network path, and an encrypted user credential which is encrypted using the key known only to the single sign-on server, and wherein the network path derived from the clear secret path information in the domain-token cookie matches the decrypted network path in the request.

20. The apparatus of claim 19, further comprising:

a receiving mechanism configured to receive an operation request from the client at an application server that requires authentication of the client, prior to the apparatus receiving the domain cookie;

wherein the request mechanism is further configured to send a second request to the client for a domain cookie, in response to the operation request;

wherein the cookie receiving mechanism is further configured to receive the domain cookie at the application server in response to the second request; and a forwarding mechanism configured to forward the domain cookie to the single sign-on server.

* * * * *